INVENTORS
JOSEPH CZULAK
NORMAN H FREEMAN
JAMES R. O'CONNELL
ATTORNEYS

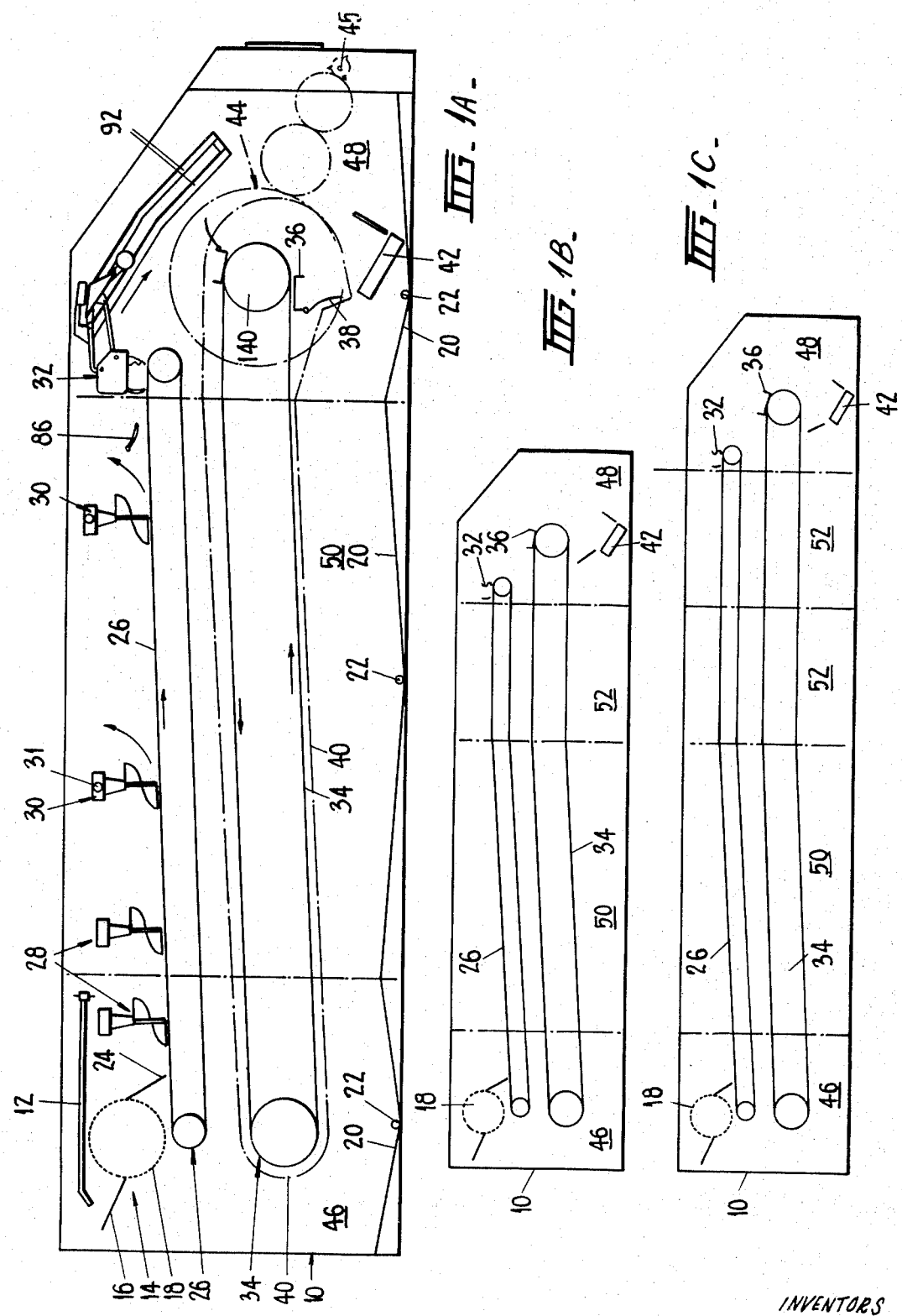

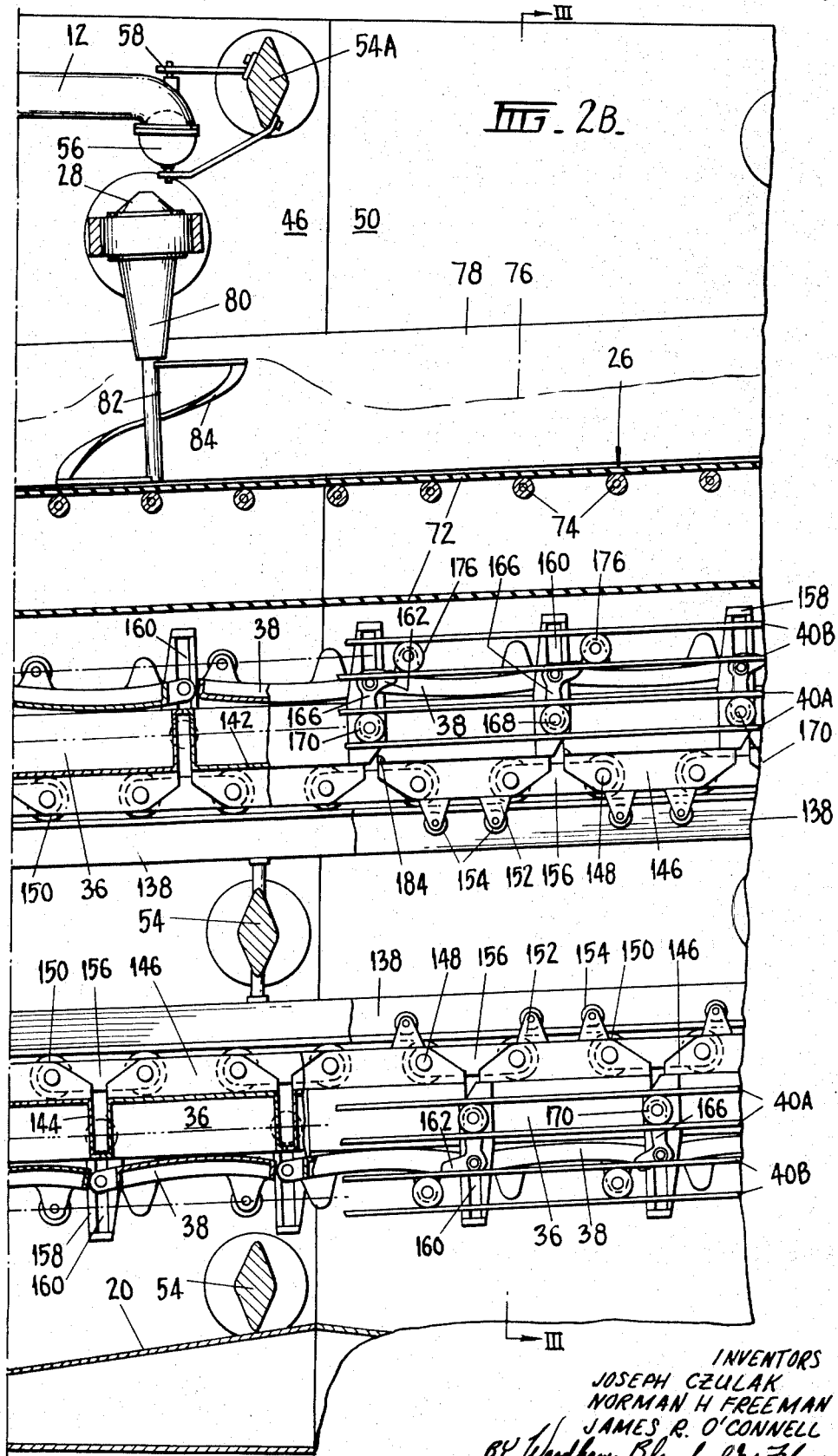

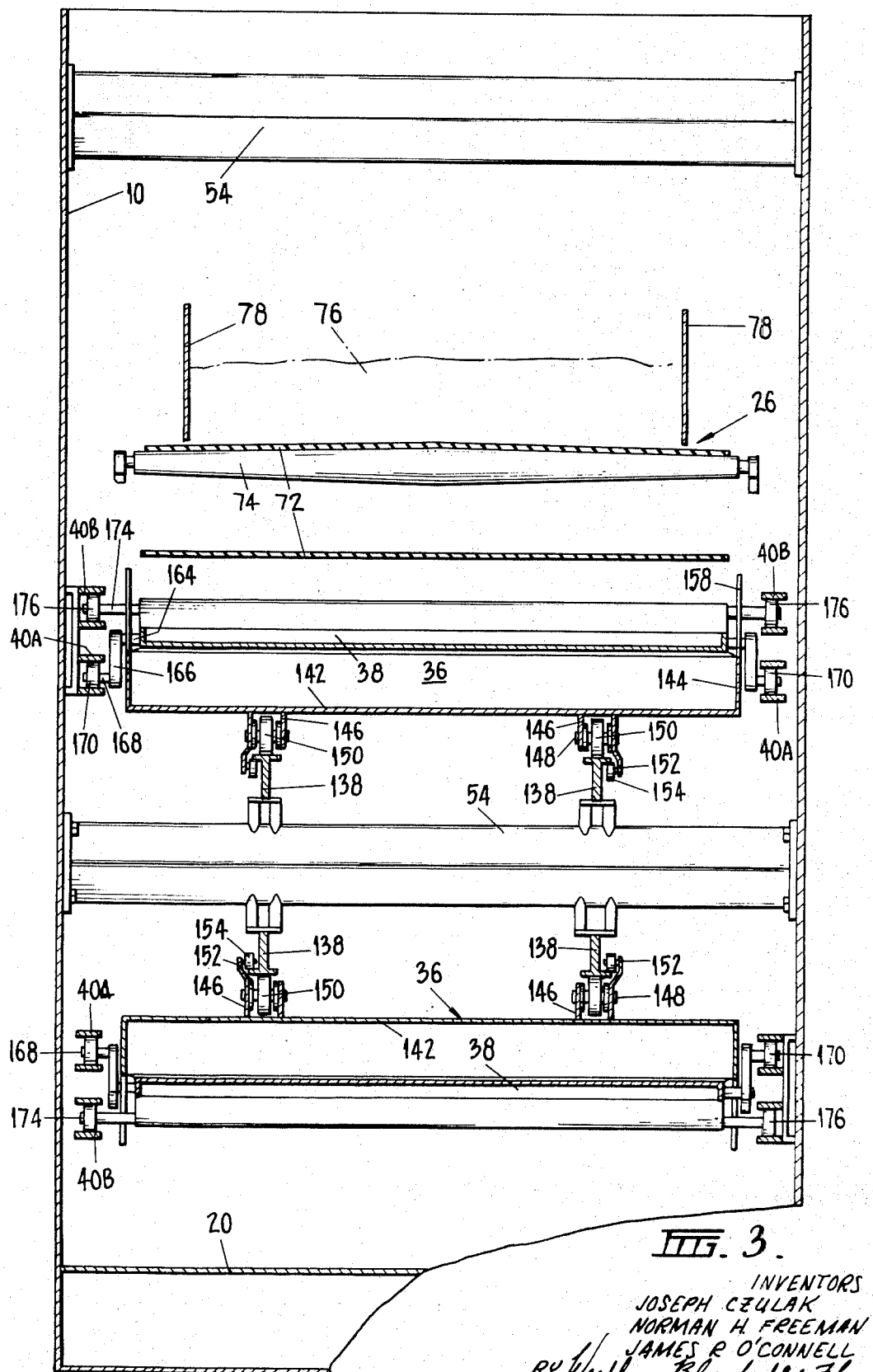

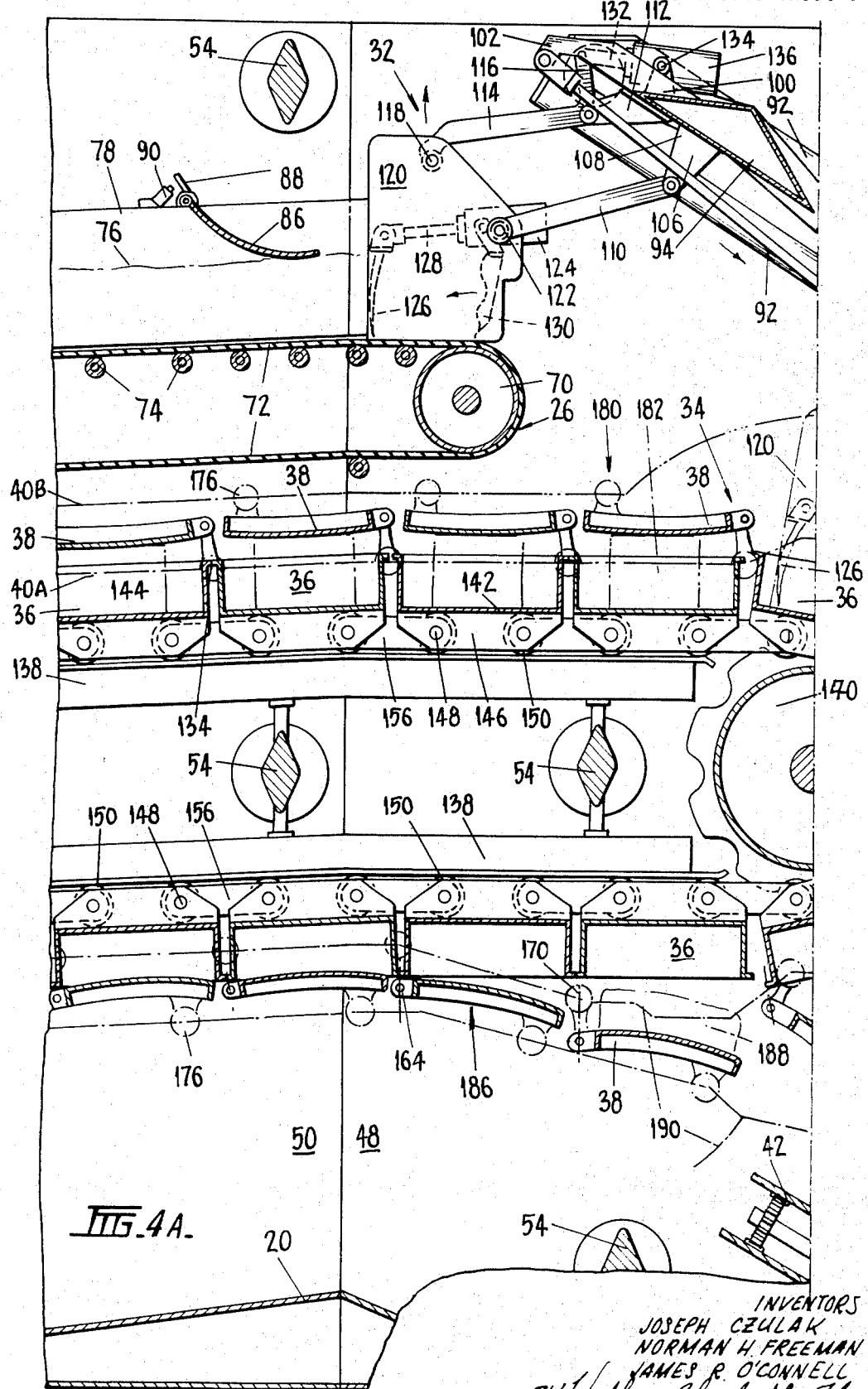

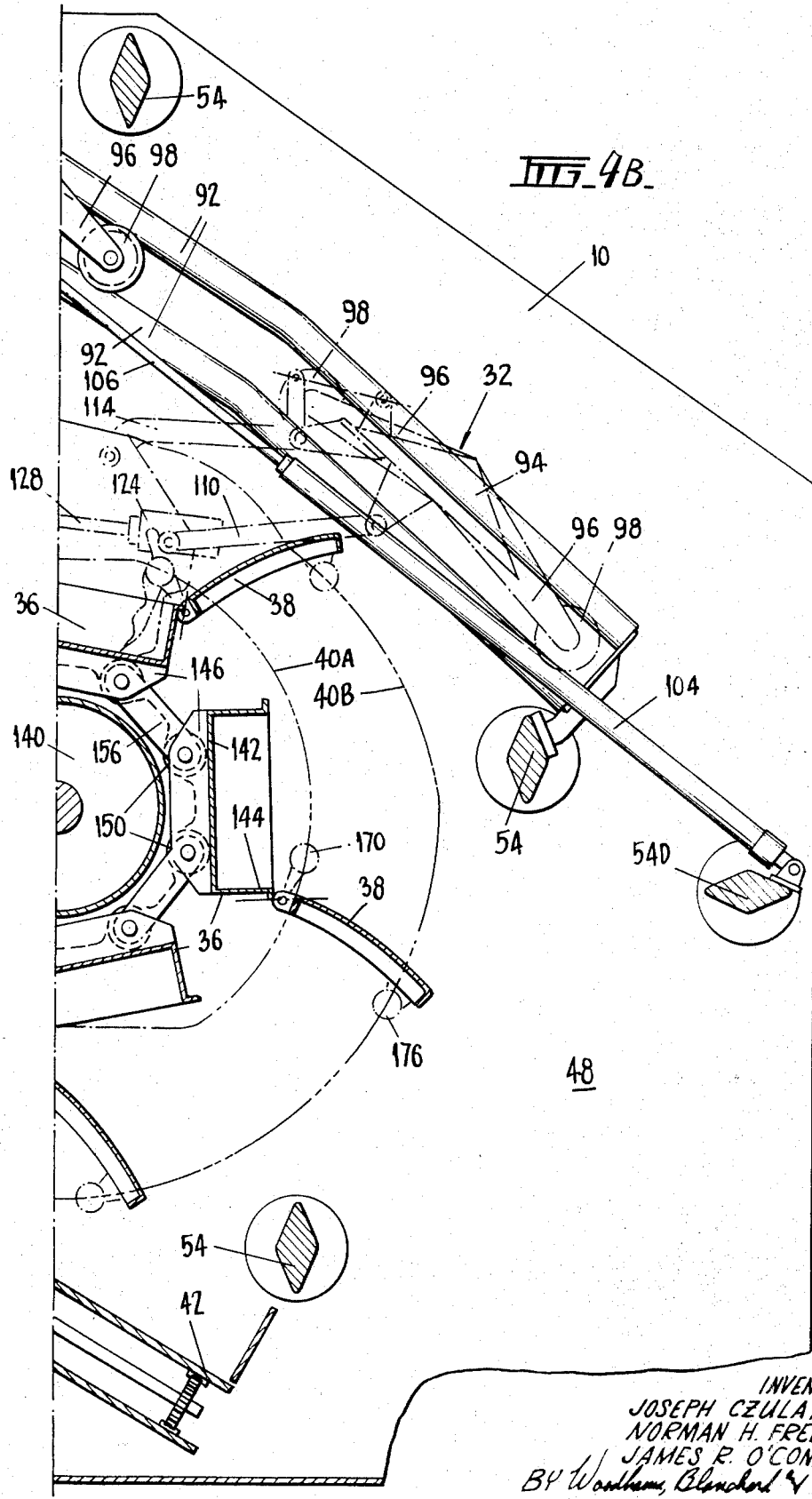

3,695,893
METHOD AND APPARATUS FOR PROCESSING CURD IN THE MANUFACTURE OF CHEESE
Joseph Czulak, Greenslopes Nepean Highway, Mount Eliza, Victoria, Australia; Norman H. Freeman, 475 Moreland Road Moorabbin, Victoria, Australia; and James R. O'Connell, 3 Porter Road, Pascoe Vale South, Victoria, Australia
Filed Jan. 29, 1970, Ser. No. 6,915
Claims priority, application Australia, Feb. 5, 1969, 50,076/69
Int. Cl. A23c *19/02*
U.S. Cl. 99—116                10 Claims

ABSTRACT OF THE DISCLOSURE

Apparatus and method for processing cheese curd and whey in manufacture of cheddar cheese by passing curds and whey over a screen to drain off the bulk of the whey, feeding the separated curd to a conveyor so that it forms a layer thereon and stirring the layer to facilitate further drainage of whey, cutting blocks from the layer and compressing the blocks in respective containers each of which is large enough to permit its block to flow under compression to produce fibre development of the curd.

---

The present invention relates to processing of curd in the manufacture of cheese.

In the manufacture of cheese from a mixture of cheese curds and whey it is now well known that the curds must first be separated from the whey, the separated curds must be adequately drained and consolidated and the drained and consolidated curd must be caused to flow to obtain fibre development thereof.

In one known method for performing this operation, the process is operated on a batch basis. In this process, a batch of cheese curds and whey mixture is produced, the whey is separated and the resultant batch of separated curd then goes through a drainage and compression process to produce fibre development in the drained curd. The batch process suffers from alternative disadvantages, namely either the batch must be made uneconomically small or else severe problems are encountered in obtaining adequate drainage and consolidation of the mass of separated curd and in providing sufficient pressure to ensure adequate flow and fibre development. It is frequently found, for instance, that although the periphery of the mass of curd produced in each batch is drained and consolidated and has adequate fibre development, the central portion remains soggy and has totally inadequate fibre development.

A more or less continuous process is known in which a mass of curd is divided into blocks which are carried by respective compartments of a slat conveyor. Such a system is described in the printed specification of British Pat. No. 1,150,403 to Commonwealth Scientific & Industrial Research Organisation. As described in that specification, a certain amount of drainage and consolidation is obtained in the slat conveyor and in the "crumb buckets" to which the blocks are respectively transferred from the compartments of the slat conveyor. From the crumb buckets, the blocks pass by way of a set of "transfer buckets" to a final set of "compression buckets." In the latter, one wall of each bucket is moved towards the other so as to squeeze a block therebetween and cause it to flow to give the required fibre development.

The system described in the British patent specification referred to above had the disadvantage that it was extremely complex in including four different conveyors which had to be carefully synchronised to give correct transfer of blocks from one to the other. Drainage and consolidation of the curd was effected in the first two conveyors under the effect of gravity, and therefore the size of each block was limited for reasons similar to those outlined above in relation to the batch process. Further, since the blocks were transferred between the conveyors under the effect of gravity, there was a further limitation on the size of the block in that they were liable to breakage during transfer. In addition, the complexity of the system and the large number of transfer operations decreased the speed of the continuous operation.

It is an object of the present invention to provide an improved method and apparatus for processing cheese curd so as to permit continuous operation of the system while obtaining adequate drainage, consolidation and fibre development of the cheese curd.

According to the present invention there is provided apparatus for use in the manufacture of cheese comprising means for producing a continuous body of cheese curd, a plurality of open-topped containers, conveyor means for transporting said containers in succession around a closed path, means for cutting blocks of curd from said body and transferring them to respective ones of said open-topped containers each of which is of such size and shape relative to its block that the latter, when appropriately located therein, can flow in a predetermined manner to cause fibre development of the curd, and each container having means to apply pressure to a block therein sufficient to complete consolidation and drainage of the curd and to cause said flow.

The invention also provides a corresponding method for use in manufacture of cheese.

According to a feature of the invention there is provided apparatus for use in manufacture of cheese from a cheese curd/liquid mixture comprising first separation means to effect an initial separation of fluid from the curd, a conveyor having a surface arranged to receive curd and remaining liquid from said first separation means and convey it as a continuous body to a location remote from said first separation means, said conveyor having means to permit fluid to drain from the curd, curd lifting means adjacent the conveyor for applying a lifting force to curd on the conveyor surface to thereby facilitate drainage of liquid from the curd, a plurality of open-topped containers, conveying means for transporting said containers in succession around a closed path, means at said location for cutting blocks of curd from said body and transferring them to respective ones of said open-topped containers each of which is of such size and shape relative to its block that the latter, when appropriately located therein, can flow in a predetermined manner to cause fibre development of the curd, and each container having means to apply pressure to a block therein sufficient to complete consolidation and drainage of the curd to cause said flow.

To facilitate an understanding of the invention one embodiment thereof and the operation of that embodiment will now be described with reference to the accompanying drawings, in which:

FIG. 1A is a diagrammatic view of the apparatus as a whole,

FIGS. 1B and 1C show respective views of an apparatus generally similar to that of FIG. 1A but of larger capacity, these figures being drawn to a smaller scale than FIG. 1A, FIGS. 2A and 2B are sectioned views of adjoining portions of one end of the apparatus shown in FIG. 1A;

FIG. 3 is a section on the line III—III in FIG. 2B; and

FIGS. 4A and 4B are sectioned views of adjoining portions of the other end of the apparatus shown in FIG. 1A.

Figure 2A:
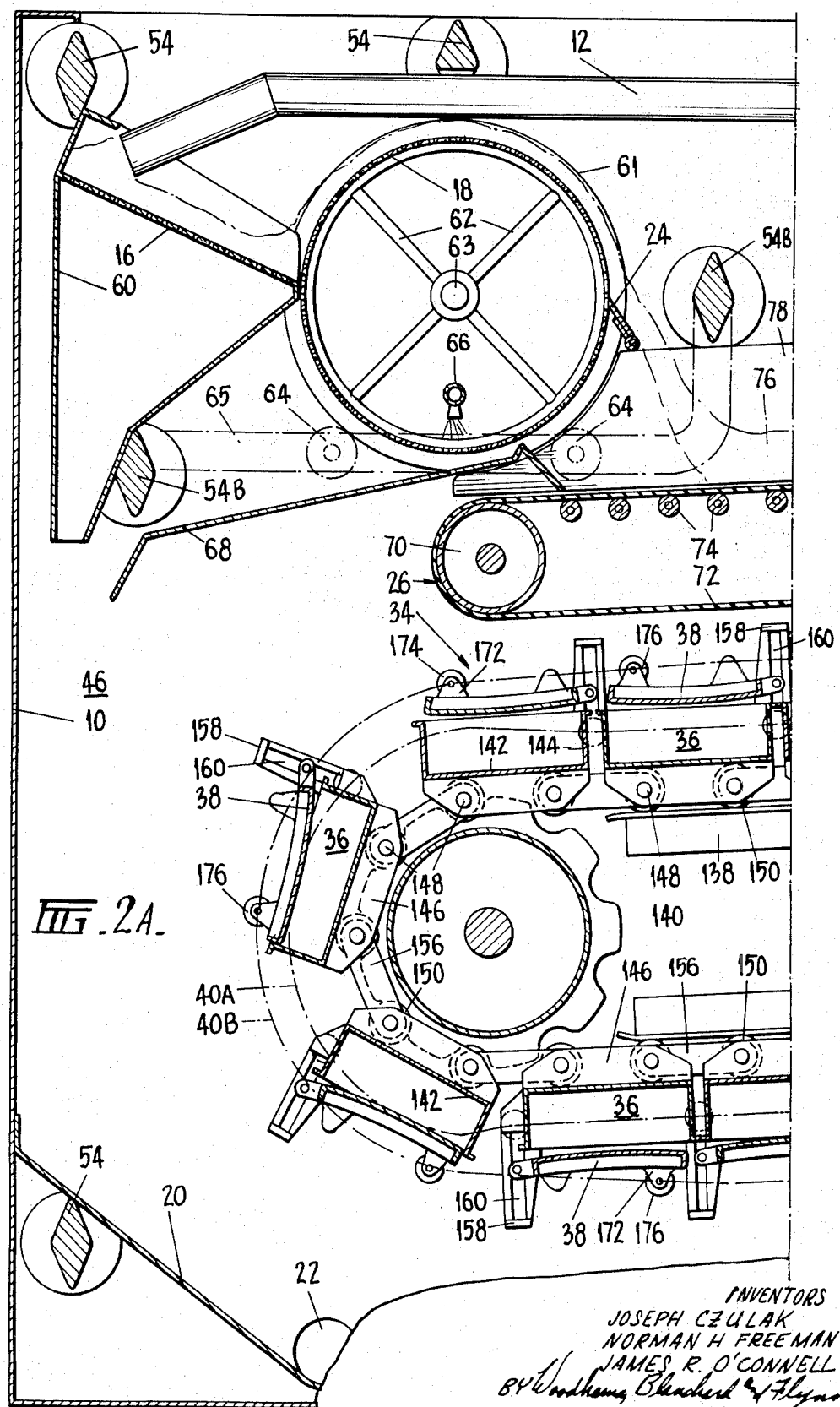

In FIG. 1A the numeral 10 indicates an outer frame in which the remaining parts of the apparatus are supported by means to be described. Supported within the frame 10 is a pipe 12 by means of which a mixture of curds and whey can be fed to a first separation stage 14. This separation stage comprises a perforated screen 16 which receives the curds and whey mixture from the pipe 12 so that part of the whey passes through the screen and the remaining mixture is fed to a perforated drum 18. The bulk of the whey is separated from the curd by passage through screen 16 and drum 18 and is passed, by means to be described, to whey tanks 20 which extend along the bottom of the frame for the full length thereof. From tanks 20 the whey is removed along pipes 22.

The separated curd after passing around the upper portion of drum 18 is passed by way of a guide plate 24 to a "fusion" conveyor 26. The curd forms a layer upon fusion conveyor 26 and travels along the upper run of the conveyor from one end to the other. While the curd is on conveyor 26, it is gently stirred by sets of curd lifting means indicated at 28 and 30. Each lifting means gently opens up the curd to permit remaining whey to drain therefrom off the sides of the conveyor, from whence it also passes to whey tanks 20. As indicated in FIG. 1A, four sets of curd lifting means are provided, but two sets (indicated by the numeral 30) are mounted for pivotal movement about respective horizontal axes 31. These sets can be swung upwardly away from the conveyor 26 as indicated by the arrows adjust them. Accordingly, the amount of stirring imparted to the curd can be adjusted.

At the end of conveyor 26 remote from drum 18, the curd layer will be almost completely drained and will be partially consolidated from the effect of gravity. As the layer reaches that end, blocks of curd are cut from it by a cutting and transporting assembly generally indicated by the numeral 32. Having cut a block of curd from the layer on conveyor 26, the assembly 32 transports it to one end of a second conveyor 34 which is located below conveyor 26 and rotates in the opposite direction. Conveyor 34 comprises a plurality of compression boxes 36 only two of which are indicated in FIG. 1A. The assembly 32 places the block of curd it has cut from the layer into a box 36 which is just beginning to move along the upper run of conveyor 34.

Each box 36 has a lid 38 pivotally mounted at its trailing edge, the lid being provided with cam followers (not shown in FIG. 1A) which co-operate with cam tracks 40 diagrammatically indicated in the figure. The cam tracks and followers control the disposition of the lid 38 relative to its box 36 at all locations around the conveyor path. The lid is pivoted wide open so that the block may be freely placed in the box as the latter begins its travel along the upper run of the conveyor. As each box moves along the conveyor path from the block receiving position, the tracks 40 and cam followers first pivot the lid to a position substantially parallel with the open top of its box 36 and then move the lid 38 until it closes the box.

Each box 36 is dimensioned in relation to the block it receives so that the block can be placed in the centre thereof to be free of all side walls and to project from the open top at the receiving end of the conveyor 34. As lid 38 converges with the box, the block within is compressed and caused to flow outwardly to the side walls. During this step any remaining whey in the curd block is expressed by the positive pressure applied by the lid in co-operation with the cam tracks, and the flow of the curd within the box is arranged to provide the required fibre development of the curd. If necessary arrangements may be made to control the temperature of each box to maintain it at the desired value suitable for this processing step.

When a box 36 reaches the "receiving" end of the lower run of the conveyor, cam tracks 40 diverge from the conveyor and permit the lid 38 of the box to open wide again. Thereupon the block of compressed curd within the box is permitted to slide down the lid under the effect of gravity and onto a slide 42 position to receive it. From there the block can be passed to other processing equipment, for instance it can be passed under a guillotine mechanism diagrammatically indicated at 43, and the smaller blocks issuing from the guillotine can be salted and hooped.

Conveyor 34 is driven at its receiving end and coupled thereto is a gear train diagrammatically illustrated in FIG. 1A and indicated by the numeral 44. Gear train 44 drives a shaft 45 upon which is arranged a plurality of cams which are arranged to control operation of the cutting and transport assembly 32 in synchronism with the conveyor 34 so that a block of curd cut from the layer is always accurately placed in a box 36 on conveyor 34.

The illustrated apparatus is of modular construction as indicated by the vertical lines dividing FIG. 1A. Thus, the apparatus comprises a curds and whey feed end module 46, a block cutting and transporting end module 48 and an intermediate conveyor module 50. The basic machine comprising these three modules is arranged to have a predetermined capacity of curd per hour. If it is desired to increase the capacity of the machine, an additional module 52 (FIG. 1B) is inserted between module 50 and module 48, and the capacity can be increased in a similar step by inserting another module 52 as illustrated in FIG. 1C. Thus additional capacity per hour is absorbed by increasing the length of the fusion conveyor 26 and the number of boxes on the compression conveyor 34.

The curds and whey feed module 46 is illustrated in greater detail in FIGS. 2A and 2B which illustrate adjoining portions of that module. As indicated in these figures, various assemblies of the apparatus are supported in the frame 10 by means of generally diamond shaped cross struts 54. Strut 54A (FIG. 2B) supports an in-feed pipe 56 which passes through the wall of frame 10. At its inner end, pipe 56 is connected to the end of pipe 12 by a connection which permits pivotal movement of pipe 12 about a vertical axis and relative to pipe 56. Pipe 12 is also mounted on strut 54A but by a pivotal mounting 58 which permits the aforementioned pivotal motion.

The discharge end of pipe 12 (FIG. 2A) is located above a generally wedge-shaped trough 60, and the perforated screen 16 extends across the mouth of trough 60. Whey passes through the screen 16 and is guided by the trough into the whey tank 20 located beneath it. The pivotal movement of pipe 12 permits deposition of curds and whey over the full width of the screen 16 from which the remaining curd and whey passes onto the perforated drum 18. The latter is mounted at each end upon an annular carrier 61. One carrier 61 is connected to a spider 62 which in turn is connected to a shaft 63 for rotation therewith. Shaft 63 extends out of the frame to a drive motor not shown. The other carrier 61 is supported by two rollers 64 which are rotatably mounted on a beam 65 carried by struts 54B.

As the drum passes its lowermost point it is washed by a water spray from a pipe 66 located internally of the drum. Curd particles washed from the drum and whey separated via drum 18 are guided by a plate 68 clear of the ends of the conveyors 26 and 34 and into the whey tanks 20. The remaining curd, with a very little remaining whey, is carried around the upper portion of the drum and stripped therefrom by guide plate 24, from which it passes to conveyor 26.

Conveyor 26 comprises a pair of end rollers 70, one only of which is seen in FIG. 2A. Around these rollers runs a conveyor belt 72 of polythene, the outer surface of the belt being glazed. Intermediate the rollers 70, the upper run of the conveyor is supported by a plurality of spaced rollers 74 which are parallel to each other and to the rollers 70. Each roller 74 has a maximum diameter at its mid-length (see FIG. 3) so that the upper run of conveyor belt 72 is crowned on its centre line to assist run-off of whey to the sides of the belt.

The curd layer, the upper level of which is generally indicated by the numeral 76 is received on the upper run of belt 72 between a pair of parallel guide rails 78 which extend longitudinally of the belt 72, but are spaced slightly above the belt so as to permit run-off of whey between the bottom of each guide rail and the outer surface of the belt. Belt 72 is driven around its rollers 70 in a clockwise direction as viewed in FIG. 2 and the curd layer is moved along with the belt. By the time it reaches the far end of the belt 72 the sides of the layer and the bottom surface thereof have been glazed by contact with the guide rails 78 and the outer surface of belt 72 respectively.

As indicated in the description of FIG. 1, sets 28 and 30 of curd lifting devices are located at spaced locations along the belt. Each set 28 and 30 comprises three lifting devices which are spaced transversely of the belt so as to act on the curd layer over substantially the full width thereof. Each curd lifting device comprises a drive motor portion 80 (FIG. 2B) having an output shaft 82 on which is mounted a spiral vane 84 which extends into the curd layer. Upon energization of the motor 80, shaft 82 drives its vane 84 to gently stir and lift the curd in the layer, so as to open the layer to permit drainage of whey therefrom.

The general arrangement of the first separation stage, conveyor 26 and the curd lifting means is the subject of United States patent application No. 758,047 filed Sept. 6, 1968.

As the curd approaches the assembly 32 (FIG. 4A) it passes beneath an arm 86 which is pivotally mounted between the upper edges of guide rails 78. The depth of the curd layer on belt 72 is controlled by the rate at which curds and whey are fed to the machine via pipe 12 and the speed of movement of conveyor belt 72. The pivoting movement of pipe 12 should be such as to make the layer substantially even across the width of the belt, and the rate of flow of curds and whey to the machine should also be more or less even so as to give a desired layer depth for a fixed belt speed. If the level 76 of the curd layer rises above the predetermined value however, arm 86 pivots on its mounting so that an extension 88 of the arm operates a micro switch 90 so as to stop the machine. An alarm may also be operated to call the attention of an operator to the fault.

The curd cutting and transport assembly 32 comprises a trolley which runs between two pairs of rails 92 supported on frame 10, only one pair being seen in FIG. 4. The trolley comprises a frame 94 which is substantially triangular in cross-section. Extending from each side edge of frame 94 in both directions relative to the rails, are arms 96 (FIG. 4B) upon which wheels 98 are mounted to co-operate with rails. Each wheel 98 has a concave rail contacting face to co-operate with corresponding faces on one rail pair. Extending upwardly from frame 94 are two arms 100 located on respective sides of the frame so that only one can be seen in the figure. Each arm 100 has a hooked end 102. A pair of main rams extend between respective arms 100 and a strut 54D (FIG. 4B). The cylinder 104 of each main ram is pivotally mounted on the strut, while connecting rods 106 join the respective ram pistons to respective hooked ends 102 of the arms 100. Pressurisation of the main rams therefore moves the trolley to the upper ends of rails 92, and depressurisation permits the trolley to move back under its own weight to the lower end of the rails.

The following linkage is duplicated on either side of frame 94; since only one set of links can be seen in the drawings, only that set will be described. A bracket 108 is welded to the underside of the frame 94 and a link arm 110 is pivotally mounted on the bracket at a location spaced from the frame. A second bracket 112 is welded to the frame above the bracket 108 and a bell crank lever having arms 114 and 116 is pivotally mounted at its elbow on the bracket 112. The end of arm 116 remote from the bracket 112 is pivotally connected to a rod 132 which is attached to the piston of an auxiliary ram, the cylinder 136 of which is pivotally mounted on brackets 134 welded to the frame 94.

At its end remote from the frame 94, each arm 114 is pivotally connected to a strut 118 which joins a pair of side walls 120 of a claw assembly now to be described. Also, at their ends remote from the frame 94 the arms 110 are pivotally connected to a pair of shafts 122 which are in turn pivotally mounted in respective walls 120. The ends of shafts 122 remote from their respective walls 120 form trunnions for a cylinder 124 of a clamping ram. A curved blade 126 is mounted on a rod 128 connected to the piston of the clamping ram, while a corrugated clamp plate 130 is pivotally mounted by suitable links on cylinder 124.

Retraction of the clamping ram by movement of rod 128 into cylinder 124 therefore draws blade 126 towards plate 130 and extension of the clamping ram moves them apart. Retraction of the auxiliary rams by movement of rods 128 into respective cylinders 136 pivots the bell cranks about their connections with the brackets 112 so as to raise the claw assembly relative to the trolley and extension of the auxiliary rams lowers the claw assembly.

Accordingly, when it is desired to cut a block of curd from the layer, the main rams are pressurised to move the trolley to the upper end of the rail member 92. The clamping ram and the auxiliary rams are then extended so that the blade 126 is driven into the layer and cuts through it to separate a block from it. The clamping ram is then retracted so that blade 126 is pulled back towards clamping plate 130 and the separated block is clamped between the blade and the plate. Auxiliary rams 136 are then retracted so that the claw assembly is lifted clear of the conveyor by the arms 114 and 110. Both blade 126 and plate 130 extend substantially the full width between the guide rails 78 and accordingly the block carried by the claw assembly is supported along both its long side faces. It is therefore securely held against breakage under the effect of gravity.

The main rams are then depressurised and the trolley moves to its lowermost position on rail member 92 under its own weight and that of the block carried by it. The lowermost position of the trolley is indicated in dash-dot lines in FIG. 4B. When the trolley reaches its lowermost position, the auxiliary rams 136 are extended so that the claw assembly is accurately placed centrally in a box 36 on conveyor 34, which box, as was described with reference to FIG. 1A, is open to receive the assembly at that time. The clamping ram 136 is then extended to cause release of the block, and the auxiliary rams are then again retracted to lift the claw assembly clear of the box. The main rams are then again operated to move the trolley back to the upper end of the rail member 92 to cut off a further block from the layer and the block now placed in the box 36 is carried away by the conveyor 34 and compressed, as now to be described.

The immediately following description refers mainly to FIGS. 2B and 3. The portion of the conveyor 34 shown in the right of of FIG. 2B is in full side elevation to show all relevant details of the boxes, lids and cam tracks. The portion of the conveyor on the left of the same figure is shown in section, and some details, particularly those of the cam tracks, have been omitted to avoid confusing the drawings. FIGS. 2A, 4A and 4B are similar to the left hand portion of FIG. 2B in this respect.

The support structure for compression conveyor 34 comprises four rolled steel joists 138 which are supported in parallel relationship at respective corners of an imaginary rectangle (see FIG. 3). Joists 138 are secured to struts 54 spaced along the length of the conveyor. At each end of the joists 138 there is provided a sprocket-like wheel 140 (FIGS. 2 and 4), the wheel 140 at the claw assembly end being a drive wheel, while the other is an idler.

Each box 36 of the conveyor 34 comprises a floor 142 and side walls 144, the box being rectangular in configuration and constructed of stainless steel. The length of each box is transverse to the conveyor path and its width lies along that path. Two pairs of plates 146, best seen in FIG. 3, are welded to the underside of the floor 142 of each box so that the pairs are in alignment and parallel with respective joists 138 (see FIG. 3) on the upper and lower run of the conveyor. Two parallel stub shafts 148, one in front of the other, are journalled between each pair of plates 146. Each shaft 148 carries a roller 150 which runs on the corresponding joist 138 while it is in alignment therewith and which co-operates with a recess in one of the sprocket-like wheels 140 after leaving the joist. On each outer plate 146 there is welded a pair of brackets 152, each bracket carrying at its end remote from the plate 146 a shaft 152 upon which a roller 154 is rotatably mounted. While the box is running on a joist 138, each roller 154 co-operates with the underside of the joist web engaged by the roller 150. Adjacent boxes 36 are joined by two pairs of connector plates 156, each pair coupling adjacent shafts 148 on adjacent boxes. The pairs of plates 156 are disposed inwardly of respective pairs of plates 146, and have aligned holes to receive the corresponding shafts 148.

Welded to the outside of the trailing side wall 144 of each box 36 are a pair of guide plates 158 one at each end of the box (FIGS. 2 and 3). Each guide plate has a blind slot 160 therein. Lid 38 of each box 36 is provided at its trailing edge with a pair of rearwardly extending lugs 162 located one at each end thereof so as to be disposed inwardly of the guide plates 158. Each lug 162 has a stub shaft 164 extending outwardly therefrom through the guide slot 160 on the corresponding guide plate. Shafts 164 are capable of sliding longitudinally of guide slots 160. The shafts are coaxial and each lid 38 can be pivoted about the axis of its aligned shafts 164.

Secured to each shaft 164 at its outer end is an arm 166 which extends generally at right angles to the width of the lid 38 and which is pivotal with the lid by reason of its connection with its stub shaft 164. At its end remote from the lid, each arm 166 carries an outwardly extending stub shaft 168 upon which there is mounted a roller 170. Each roller 170 co-operates with an inner set of cam tracks 40A. Adjacent the leading edge of each lid 38 there is mounted on each side edge a bracket 172 and a further pair of stub shafts 174 are mounted on respective brackets 172. Rollers 176 are mounted at the outer ends of respective shafts 174 and cooperate with an outer set of cam tracks 40B. Wherever the cam tracks have been omitted from the drawings, the loci of the axes of the sets of rollers have been indicated to show the effect of the various sets of tracks on the rollers and hence on the lids.

In describing the action of the sets of cam tracks on the lids of the boxes it is convenient to consider the passage of one box around the conveyor path beginning at a location after a block has been located in the box and the lid of the box has been arranged substantially parallel to the floor. Such a location is indicated by the arrow 180 in FIG. 4A. As seen in that figure, the block indicated at 182 is clear of the leading and trailing side walls and projects from the open top of the box. It is also clear of the end side walls although this cannot be seen in the figure.

As the box moves along the conveyor path, the sets of cam tracks 40A and 40B converge gradually with the joists 138 so that the lid 38 is gradually forced down onto the top of the block. This gradual compression of the cheese curd causes it to flow outwardly towards the side walls of the boxes while its height is reduced. It is found that considerable flow of the block occurs under the effect of gravity alone in the early stages of movement around the conveyor path, and loading on the lid is not substantial on the upper run.

As each block is compressed by the lid, remaining free whey is squeezed from it and flows out of the boxes via small drain holes provided in the corners thereof. These drain holes have been indicated at 184 on the right hand portion of FIG. 2B but not in the other figures. As the box passes around the idler sprocket wheel 140 cam tracks 40A diverge from the box and tracks 40B converge therewith so that the leading edge of the lid is tilted towards the box. This prevents the block sliding downwards as the box becomes vertical. This tilting of the lid is cancelled as the box moves onto the lower run of the conveyor. It will be noted from FIG. 3 that lid 38 is arranged so that there is a small gap between itself and the side walls of the box. Hence even when the box is inverted egress of whey through this gap can continue. All such whey expressed during the compression stage passes to the whey tanks 20. Gravity assists in run off of free whey as the box moves along the lower run of the conveyor, but substantial pressure must now be applied by the lid to cause the desired flow to give fibre development.

As the box approaches the discharge location indicated at 186 in FIG. 4A, movement of the lid towards the box ceases with maximum pressure applied so as to cause the block to "take a set" and prevent "springing" as the box opens. Over this section of the conveyor path the lid 38 of each box is substantially aligned with the edges of the side walls thereof and compression of the curd is complete. The curd will at this stage substantially fill the box having flowed to engage each side wall thereof.

At location 186, each set of cam tracks diverges from the joists 138 so that the lid 38 both pivots about its aligned shafts 164 and is moved away from the container by movement of those shafts along the guide slot 160. The block under the effect of gravity remains on the lid as it leaves the box as is indicated by the numeral 188. At location 190 a sharp movement of the cam tracks away from the box will be noticed, this movement being sufficient to pivot the lid to an angle such that the block slides from the lid onto the chute 42 which is suitably positioned to receive it. The movement is made very sharp so as to initiate sliding of the block. The angle of the lid as the block slides off it may be as much as 55° to the horizontal.

As the box moves onto the drive sprocket 140, pivoting movement of the lid away from the box continues as can be seen in FIG. 4B, so that the box is wide open to receive the claw assembly and a new block at the loading station just before the upper run of the conveyor. Immediately after the new block has been placed in the box and the trolley has been removed, the cam tracks 40B diverge from the conveyor and cam tracks 40A converge with it so as to cause pivoting movement of the lid back towards the box. Due to the divergence of cam tracks 40B however, shafts 164 are drawn along their guide slots 159 away from the box so that when the lid is substantially horizontal in the position 180 the shafts 164 are at the upper ends of the guide slots and movement of the lid to the horizontal position has been effected without disturbing the block 182.

It will be noted that each lid is curved about an axis parallel to its length so as to be slightly convex inwardly of the box. This curvature strengthens the lid against the bending forces applied to it during compression of the block. It has also been found to assist in causing the block to spread and flow as desired, and hence to reduce the loading necessary to give the desired flow. This is advantageous because, as will appear from the loading figure given below, very considerable loadings can be involved.

The following dimensions of the various parts have been found suitable for a machine handling 6,000 lbs. of cheese curd per hour.

Width of fusion belt between steel guide plates: 54"
Thickness of curd layer on curd fusion belt: 9½"
Dimensions of block cut off from layer: 54" x 9½" x 9½"
Dimensions of interior or compression box:
   63" x 16" x 5½"
Length of conveyor 26: 25'4"

This machine uses a conveyor 34 made up of forty-two boxes which abut each other on the conveyor. The times for which the curd is held on the curd fusion conveyor and in the boxes are variable as found suitable but respective times of 61 minutes and 69 minutes have been found suitable. During the compression stage, the block flows to abut the side walls of the box, and due to the convexity of the lid the height of the block is reduced to about 4½". The maximum load on the lid is then approximately 750 lbs., 80–85% of this load being applied on the lower run of the conveyor.

The machine is built in modules and the capacity can be increased to 8,000 lbs. of curd per hour by the insertion of an additional 9' of curd fusion conveyor and 12 boxes. Insertion of a further similar module increases the capacity to 10,000 lbs. of curd per hour.

Addition of modules of this size involves also adjustment of times for which the curd is held in the various stages. Suitable times for the 8000 lb./hr. apparatus have been found to be 63 minutes on the fusion conveyor and 67 minutes on the compression conveyor. Suitable times for the 10,000 lb./hr. apparatus have been found to be 63 minutes on the fusion conveyor and 68 minutes on the compression conveyor.

As described above, the trolley is synchronised with the compression conveyor by the cams on shaft 45 (FIG. 1A) which control operation of the various rams described with reference to FIG. 4. The required volume of curd in each block can be obtained by suitable adjustment of the speed on conveyor belt 72 and the spacing of blade 126 and clamp plate 130.

The apparatus described above has several advantages when considered in relation to the prior art. For instance, it is designed for continuous operation which is preferable to a batch process. Despite the possibility of continuous operation of the apparatus, only one block transfer operation is involved while the curd is only partially consolidated, namely the transfer between the fusion conveyor and the compression conveyor. This transfer operation is not effected under the action of gravity but by means of the claw assembly, and by means of this assembly each block is positively supported against breakage during the whole transfer operation. As compared with the previous complicated system of consolidation and compression conveyors, the number of conveyors used in the present apparatus is quite small and there is a consequent reduction in complexity and ease of synchronisation. Also, despite the fact that the process is continuous, the curd is adequately drained and consolidated because the blocks are treated individually and positive pressure is applied to each to ensure the required degree of drainage consolidation and flow to produce fibre development. In this respect, the inversion of the block on the lower run of the compression conveyor is an advantage in permitting free whey to run in both directions relative to the block during the compression step.

It is emphasised that the apparatus illustrated in the drawings is described by example only and is not limiting on the scope of the invention as a whole. The latter is determined only by the appended claims.

We claim:

1. A method for use in manufacture of cheese from a cheese curd/liquid mixture which comprises the steps of passing the mixture to a first separation stage to effect an initial separation of the liquid from the curd, passing the curd and remaining liquid to a moving conveyor so that the curd forms a continuous layer thereon, allowing liquid to drain from the curd on the conveyor, applying lifting forces to the curd on the conveyor to facilitate the drainage of the curd, cutting successive blocks of curd from said layer and transfering them to respective open-topped containers each of which is of such size and shape relative to its respective block that the latter, when appropriately located therein, can flow in a predetermined manner to cause fibre development of the curd, moving said containers with said blocks therein in succession around a closed, vertically-oriented path with said blocks and said container being inverted as they move around said path, and continuously applying pressure to each block while in its respective container as each block in its respective container is moved around said path and is inverted, said pressure being sufficient to complete consolidation and drainage of the curd and to cause said flow, said pressure being increased throughout at least a portion of the time each block is in its respective container and is being moved along said path.

2. A method as claimed in claim 1 wherein in the first separation stage the liquid and curd mixture is fed over a screen to allow free liquid to drain from the curd through the screen.

3. A method according to claim 1 wherein the curd is lifted simultaneously at a number of places arranged transversely of said conveyor to facilitate the flow of liquid off the side of the conveyor.

4. Apparatus for use in manufacture of cheese from a cheese curd/liquid mixture comprising first separation means to effect an initial separation of fluid from the curd, a conveyor having a surface arranged to receive curd and remaining liquid from said first separation means and convey it as a continuous layer to a location remote from said first separation means, said conveyor having means to permit fluid to drain from the curd, curd lifting means adjacent the conveyor for applying a lifting force to curd on the conveyor surface to thereby facilitate drainage of liquid from the curd, a plurality of open-topped containers, conveying means for transporting said containers in succession around a closed vertically-oriented path having upper and lower reaches and for inverting the containers as they move between the upper and lower reaches, means at said location for cutting blocks of curd from said layer and transferring them to respective ones of said open-topped containers each of which is of such size and shape relative to its block that the latter, when appropriately located therein, can flow in a predetermined manner to cause fibre development of the curd, and each container having means to continuously apply pressure to a block therein as said container is moved along said upper and lower reaches, said last-mentioned means also continuously applying pressure to the block as said container is inverted when moving between said upper and lower reaches, said pressure being sufficient to complete consolidation and drainage of the curd to cause said flow and said pressure being increased throughout at least a portion of the time said block is in said container and is being moved along said path.

5. Apparatus as claimed in claim 4 wherein said first separation means comprises a screen arranged above the curd receiving conveyor, means arranged on one side of said screen for discharging the curd and liquid mixture against said screen so as to effect an initial separation of the liquid from the curd and to allow the curd thus separated to move onto the conveyor surface.

6. Apparatus as claimed in claim 5 wherein said screen comprises a rotatable porous drum arranged above the conveyor surface with its axis of rotation substantially parallel and transverse to the conveyor, said means for discharging a curd and liquid mixture being arranged to discharge against the outer surface of the drum so as to effect an initial separation of the liquid from the curd and to allow the curd thus separated to move onto the conveyor surface.

7. Apparatus as claimed in claim 4 wherein the conveyor surface is imperforate.

8. Apparatus as claimed in claim 7 wherein the conveyor surface is crowned to assist run off of liquid from the sides thereof.

9. Apparatus as claimed in claim 4 wherein there is further provided guide means extending along the length of the conveyor surface on either side thereof to confine the curd on the conveyor, and thereby define the dimension of each block transverse to the conveyor, the lower edges of said guide means being spaced from the surface of the conveyor to permit liquid to drain through the space.

10. Apparatus as claimed in claim 4 wherein the curd lifting means are spaced from said location such that at least a degree of consolidation of the curd occurs before it reaches said location.

References Cited

UNITED STATES PATENTS

| | | | |
|---|---|---|---|
| 3,523,367 | 8/1970 | Czulak | 31—89 |
| 3,404,009 | 10/1968 | Lambert et al. | 99—116 |
| 1,716,488 | 6/1929 | Doering et al. | 99—243 X |

OTHER REFERENCES

Manufacturing Cheddat, Abstract of Australian patent specification No. 7,942/66, Jan. 9, 1969.

RAYMOND N. JONES, Primary Examiner

D. M. NAFF, Assistant Examiner

U.S. Cl. X.R.

31—46, 89; 99—115, 243

UNITED STATES PATENT OFFICE
CERTIFICATE OF CORRECTION

Patent No. __3 695 893__   Dated __October 3, 1972__

Inventor(s) __Joseph Czulak, et al__

It is certified that error appears in the above-identified patent and that said Letters Patent are hereby corrected as shown below:

Page 1, insert "Assignee: COMMONWEALTH SCIENTIFIC AND INDUSTRIAL RESEARCH ORGANIZATION, East Melbourne, Australia".

Signed and sealed this 22nd day of May 1973.

(SEAL)
Attest:

EDWARD M. FLETCHER, JR.
Attesting Officer

ROBERT GOTTSCHALK
Commissioner of Patents